(12) United States Patent
Molnar et al.

(10) Patent No.: US 6,680,969 B1
(45) Date of Patent: Jan. 20, 2004

(54) METHODS FOR ESTIMATING DOPPLER SPREADS INCLUDING AUTOCORRELATION FUNCTION HYPOTHESES AND RELATED SYSTEMS AND RECEIVERS

(75) Inventors: Karl James Molnar, Cary, NC (US); Leonid Krasny, Cary, NC (US); Hüseyin Arslan, Durham, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/373,289

(22) Filed: Aug. 12, 1999

Related U.S. Application Data

(63) Continuation-in-part of application No. 09/273,480, filed on Mar. 22, 1999, now Pat. No. 6,563,861.

(51) Int. Cl.[7] ............................................... H04L 27/06
(52) U.S. Cl. ........................................ 375/224; 375/343
(58) Field of Search ............................... 375/224, 227, 375/316, 346, 343, 152, 147

(56) References Cited

U.S. PATENT DOCUMENTS

| | | | |
|---|---|---|---|
| 4,633,411 A | 12/1986 | Bliss et al. | |
| 4,723,303 A | 2/1988 | Koch | |
| 5,016,017 A | 5/1991 | Kodera et al. | |
| 5,093,848 A | 3/1992 | Raith | 375/97 |
| 5,136,616 A | 8/1992 | Dent | 375/94 |
| 5,581,580 A | 12/1996 | Lindbom et al. | 375/340 |
| 5,717,723 A * | 2/1998 | Hulbert | 375/340 |
| 5,805,107 A * | 9/1998 | Schroth et al. | 342/189 |
| 6,044,105 A * | 3/2000 | Gronemeyer | 375/152 |
| 6,263,030 B1 * | 7/2001 | Khayrallah | 375/341 |
| 6,304,619 B1 * | 10/2001 | Citta et al. | 375/343 |

FOREIGN PATENT DOCUMENTS

WO        00/57568    * 9/2000      H04B/1/707

OTHER PUBLICATIONS

Lindbom, Lars, *Adaptive Equalization for Fading Mobile Radio Channels*, Licentiate Theses, Technol. Dep., Uppasala Univ., pp. 75–76 (Sweden, 1992).

Morelli, M., et al., *Further Results in Carrier Frequency Estimation for Transmissions Over Flat Fading Channels*, IEEE Communications Letters, vol. 2, No. 12, pp. 327–330 (Dec. 1998).

Wahlström, Peter, et al., *Invention Disclosure: Doppler Spread Estimator using Sequence(s) of Channel Estimates*, Ericsson, pp. 1–11 (Mar. 28, 1994).

\* cited by examiner

*Primary Examiner*—Mohammad H. Ghayour
*Assistant Examiner*—Kevin M. Burd
(74) *Attorney, Agent, or Firm*—Myers Bigel Sibley & Sajovec

(57) ABSTRACT

A Doppler spread for a communications channel is measured by providing an estimate of the communications channel and generating an autocorrelation function for the estimate of the communications channel. One of a plurality of autocorrelation function hypotheses is selected to approximate the autocorrelation function for the estimate of the communications channel wherein each of the autocorrelation function hypotheses corresponds to a respective Doppler spread estimate hypothesis. One of the Doppler spread estimate hypotheses is selected corresponding to the selected autocorrelation function hypotheses as an estimate of the Doppler spread for the communications channel.

63 Claims, 4 Drawing Sheets

| $H_1$ @20Km/hr | $R_{H,1}(0)$ | $R_{H,1}(T_1)$ | ... | $R_{H,1}(T_z)$ |
| --- | --- | --- | --- | --- |
| $H_2$ @40Km/hr | $R_{H,2}(0)$ | $R_{H,2}(T_1)$ | ... | $R_{H,2}(T_z)$ |
| $H_3$ @60Km/hr | $R_{H,3}(0)$ | $R_{H,3}(T_1)$ | ... | $R_{H,3}(T_z)$ |
| $H_4$ @80Km/hr | $R_{H,4}(0)$ | $R_{H,4}(T_1)$ | ... | $R_{H,4}(T_z)$ |
| $H_5$ @1000Km/hr | $R_{H,5}(0)$ | $R_{H,5}(T_1)$ | ... | $R_{H,5}(T_z)$ |

METHODS FOR ESTIMATING DOPPLER SPREADS INCLUDING AUTOCORRELATION FUNCTION HYPOTHESES AND RELATED SYSTEMS AND RECEIVERS

RELATED APPLICATIONS

The present application is a continuation-in-part (CIP) application of U.S. application Ser. No. 09/273,480 entitled "DOPPLER SPREAD ESTIMATION SYSTEM" filed Mar. 22, 1999, now U.S. Pat. No. 6,563,861.

FIELD OF THE INVENTION

The present invention relates to the field of communications and more particularly to receiving radio communications.

BACKGROUND OF THE INVENTION

A radio channel for a mobile terminal in a cellular radiotelephone communications system may be difficult to operate. In particular, the transmitted signals are often reflected, scattered, diffracted, delayed, and attenuated by the surrounding environment. Moreover, the radio channel for a mobile terminal is often not stationary because of movement of the mobile terminal and movement of objects near the mobile terminal. The mobile terminal may move rapidly when used in an automobile, and other vehicles may also be in motion near the mobile terminal.

Characteristics of the radio channel may also vary from one area to another due to differences in terrain/buildings, climate, and/or other factors. The propagation of a radio signal along the radio channel may thus be subject to multi-path fading, shadowing, and path loss. Of these factors, multi-path fading may be the most significant, and multi-path fading can be characterized by envelope fading, Doppler spread, and time-delay spread.

Doppler shift is the frequency shift experienced by the radio signal when the mobile terminal is in motion, and the Doppler spread is a measure of the spectral broadening caused by the time rate of change of the mobile radio channel. Doppler spread thus leads to frequency dispersion, and the Doppler spread in the frequency domain is closely related to the rate of change in the observed signal. The adaptation time of an algorithm used in an adaptive receiver should thus be faster than the rate of change of the channel to be able to accurately track the fluctuations in the received signal.

A mobile terminal in a DAMPS cellular radiotelephone communications system, for example, may experience a Doppler spread in the range of 0 Hz to 250 Hz depending on the vehicle speed, carrier frequency, and other factors. Knowledge of the rate of change of the radio channel can be used to improve receiver performance and/or reduce receiver complexity. Moreover, the adaptation parameters for an adaptive receiver can be varied as a function of the Doppler spread. Instead of fixing the tracker and interpolation parameters for the worst case expected Doppler spread, for example, the parameters can be changed adaptively as a function of the Doppler information to improve performance. Similarly, Doppler spread information can be used to control the receiver adaptively for different speeds at which the mobile may be traveling. In other words, different receiver algorithms can be used depending on the speed at which the mobile terminal is traveling.

Estimates of the Doppler spread can thus be used to increase receiver performance. The parameters of a receiver adaptation algorithm can be varied as a function of the Doppler spread to adaptively optimize a coherent detector in a receiver, for example. In addition, the hand-off process in a cellular mobile telephone system can be enhanced if an estimate of the Doppler spread is available. Handoff of a fast moving mobile terminal to a micro cell can thus be avoided.

Doppler spread estimation is discussed, for example, in U.S. Pat. No. 4,723,303 to Koch entitled "METHOD OF AND CIRCUIT ARRANGEMENT FOR MEASURING THE QUALITY OF RADIO-TRANSMISSION CHANNELS OF A RADIO-TRANSMISSION SYSTEM", and U.S. Pat. No. 5,016,017 to Raith entitled "METHOD OF CONTROLLING THE FREQUENCY OF A COHERENT RADIO RECEIVER AND APPARATUS FOR CARRYING OUT THE METHOD". The disclosures of each of these patents is hereby incorporated herein in their entirety by reference.

A method of estimating Doppler spreads from a sequence of channel estimates is discussed, for example, in the thesis by Lars Lindbom entitled "Adaptive Equalization For Fading Mobile Radio Channels", (Techn.Lic.Thesis No. UPTEC 92124R, November 1992, Department of Technology, Uppsala University, Uppsala Sweden), the disclosure of which is hereby incorporated herein in its entirety by reference. In the Lindbom thesis, differentials of the channel estimate, which comprise differences of values between two points in time, are used to estimate Doppler spreads. These differentials, however, may be noisy so that averaging may be needed. As a result, the averaging may give biased estimates of the Doppler spread.

Other Doppler spread estimation techniques are discussed in the reference by Karim Jamal et al. entitled "Adaptive MSLE Performance On The D-AMPS 1900 Channel" (*IEEE Trans. Vehic. Technol.*, vol. 46, August 1997), and the reference by M. Morelli et al. entitled "Further Results In Carrier Frequency Estimation For Transmissions Over Flat Fading Channels" (*IEEE Commun. Letters*, vol. 2, pp. 327–330, December 1998). The disclosures of these references are also incorporated herein in their entirety by reference.

Notwithstanding the approaches discussed above, there continues to exist a need in the art for improved Doppler spread estimation approaches.

SUMMARY OF THE INVENTION

It is therefore an object of the present invention to provide improved methods of estimating Doppler spreads for communications channels and related systems and receivers.

It is another object of the present invention to provide less complex methods of estimating Doppler spreads and related systems and receivers.

These and other objects can be provided according to the present invention by providing an estimate of the communications channel and generating an autocorrelation function for the estimate of the communications channel. One of a plurality of autocorrelation function hypotheses is selected to approximate the autocorrelation function for the estimate of the communications channel wherein each of the autocorrelation function hypotheses corresponds to a respective Doppler spread estimate hypothesis. The Doppler spread estimate hypothesis corresponding to the selected autocorrelation function hypothesis is then selected as an estimate of the Doppler spread for the communications channel.

The autocorrelation function hypotheses can thus be saved in a memory of a Doppler spread estimator according to the present invention and compared to the autocorrelation function of the estimate of the communications channel, with the closest autocorrelation function hypotheses being accepted as an estimate of the actual autocorrelation function for the communications channel. The Doppler spread hypothesis corresponding to the closest autocorrelation function can thus be used as an estimate of the actual Doppler spread for the communications channel. The complexity of calculations used to estimate the Doppler spread can thus be reduced while providing a relatively accurate estimate of the Doppler spread. In addition, the number of autocorrelation function hypotheses used can be increased to provide a more accurate estimation, or decreased to reduce the number of calculations and amount of memory used.

In greater detail, the selection of one of the autocorrelection function hypotheses can include comparing the autocorrelation function for the estimate of the communications channel with each of the plurality of autocorrelation function hypotheses. In addition, the selection of one of the autocorrelation function hypotheses can include selecting one of the plurality of autocorrelation function hypotheses most closely approximating the autocorrelation function for the estimate of the communications channel.

Moreover, the selection of one of the autocorrelation function hypotheses can include generating a plurality of error signals respectively corresponding to the plurality of autocorrelation function hypotheses wherein each of the error signals represents a difference between the respective autocorrelation function hypothesis and the autocorrelation function of the estimate of the communications channel, and comparing the error signals to select the autocorrelation hypothesis to approximate the autocorrelation function for the estimate of the communications channel. In particular, the error signals can be compared to choose the error signal representing a least difference between the corresponding autocorrelation function hypothesis and the autocorrelation function for the estimate of the communications channel. In addition, the comparison of the error signals can be preceded by averaging each of the error signals to provide averaged error signals wherein comparing the error signals comprises comparing the averaged error signals.

Methods, systems, and receivers according to the present invention can thus be used to provide estimates of Doppler spreads for a communications channel with reduced complexity.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
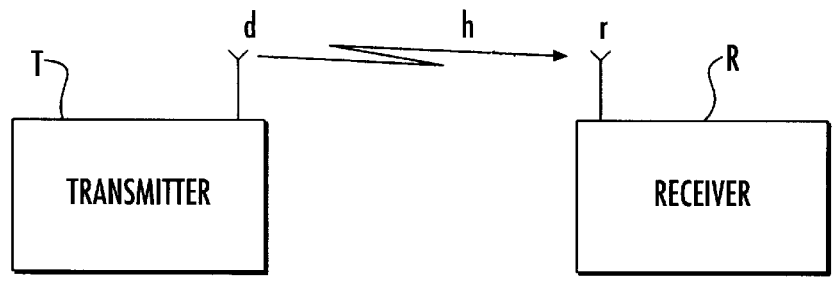
FIG. 1 is a block diagram of a communications system including a receiver according to the present invention.

FIG. 1 illustrates a transmitter T and a receiver R according to the present invention wherein data d is transmitted by the transmitter T over the radio channel c. The received signal r is a function of the transmitted data d, the radio channel c, and noise n. In a flat fading channel:

$$r = h \cdot d + n. \qquad \text{(equation 1)}$$

As discussed above, receiver performance can be improved by estimating the Doppler spread and using the estimated Doppler spread to adapt receiver functions. More particularly, the estimated Doppler spread can be used to more accurately estimate the radio channel h. The use of Doppler spread estimators in receivers is discussed in co-pending U.S. patent application Ser. No. 09/273,480 to Leonid Krasny et al. entitled "DOPPLER SPREAD ESTIMATION SYSTEM" filed on Mar. 22, 1999. The Krasny et al. application is assigned to the assignee of the present application, and the Krasny et al. application shares a common inventor with the present application. In addition, the disclosure of the Krasny et al. application is hereby incorporated herein in its entirety by reference.

Figure 2:
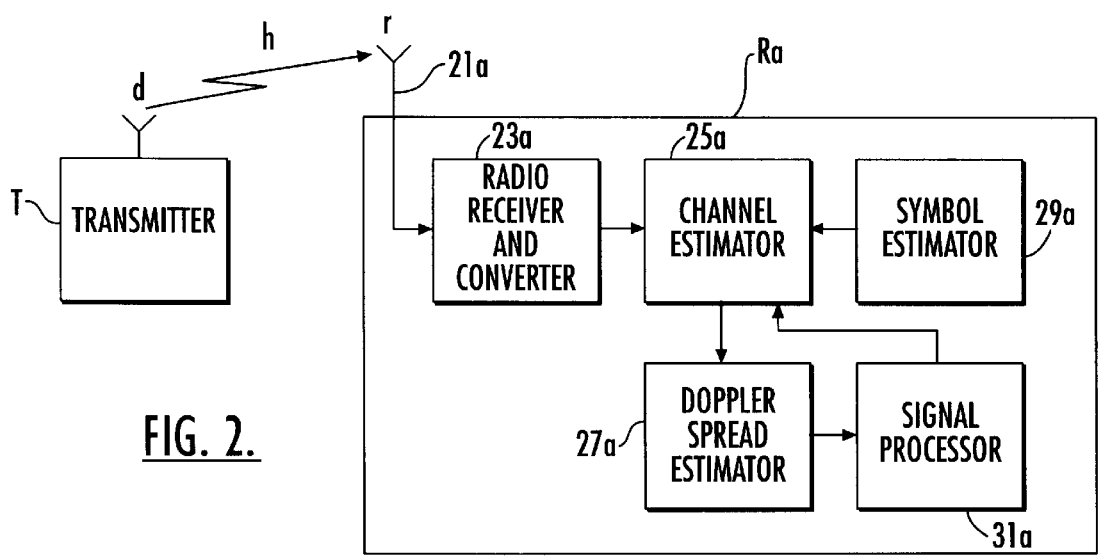
FIGS. 2–4 are block diagrams of receivers according to the present invention.
Figure 3:
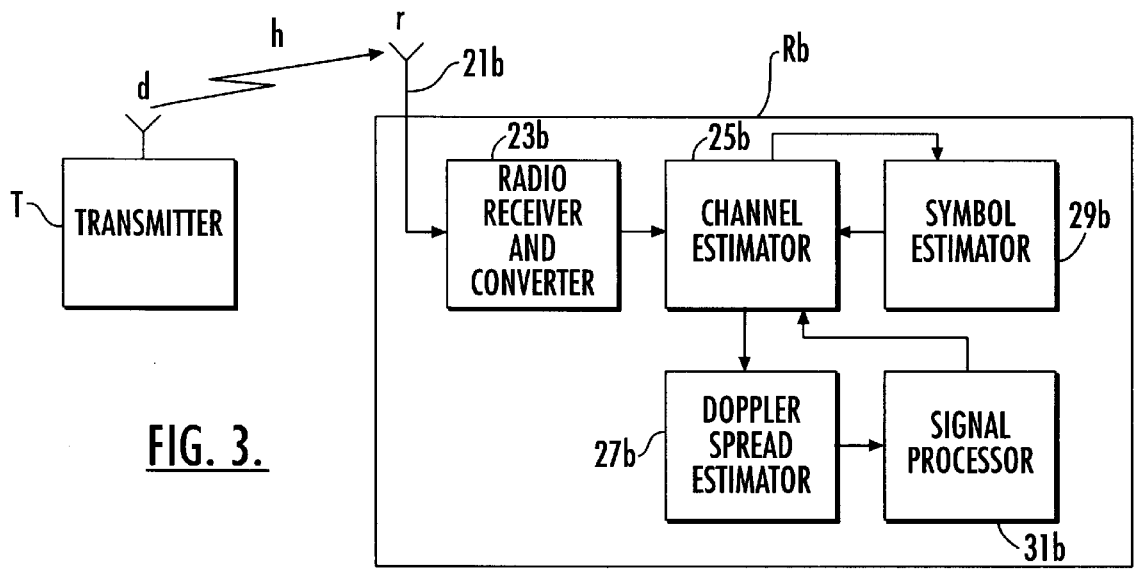
Figure 4:
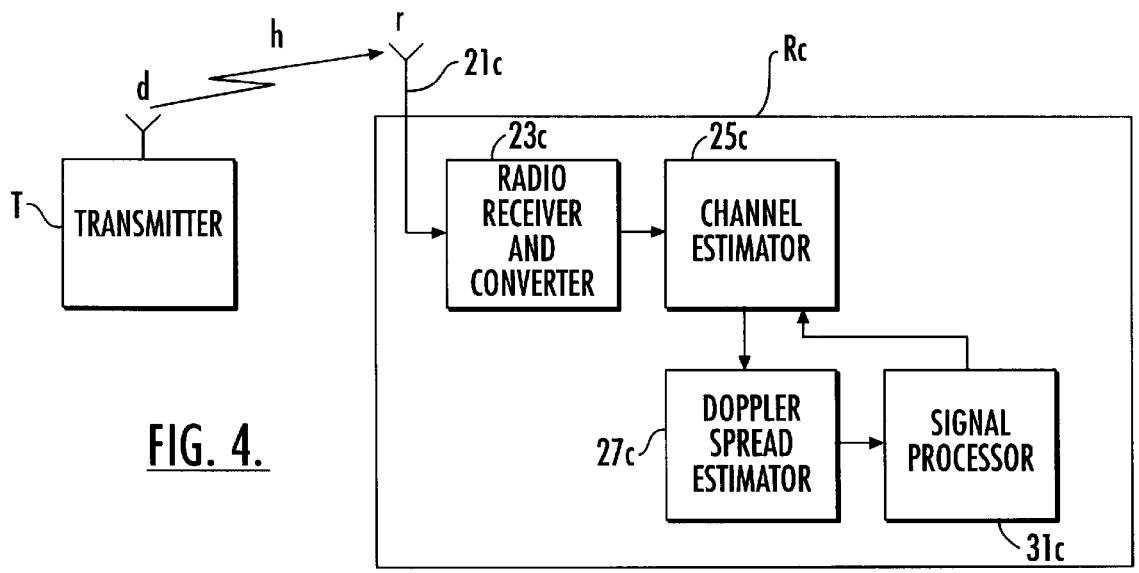

Various receivers Ra, Rb, and Rc including Doppler spread estimators according to the present invention are illustrated in FIGS. 2–4. In particular, the receiver Ra of FIG. 2 is adapted for use with known pilot symbols, and this receiver includes an antenna 21 that receives the signal r, a radio receiver and converter 23a, a channel estimator 25a, a Doppler spread estimator 27a, a known symbol block 29a, and a signal processor 31a. The antenna 21a receives the radio signals r, and the radio receiver and convertor 23a filters, amplifies, and converts the received radio signals r into digital samples for processing. More particularly, the received radio signals can be converted to a form such as complex numerical sample values suitable for processing. The channel estimator receives the converted radio signals and known symbols from the known symbol block 29a.

In particular, the known symbol block 29a can provide pilot symbols or other known reference symbols, such as synchronization symbols, included in the received signal r that can be used to calculate channel estimates. Moreover, the known symbol block 29a can include a memory where the known symbols are stored or a code generator that can generate the known symbols. The channel estimator 25a correlates the received digital samples with the known symbols to provide an estimate of the channel c to be used by the Doppler spread estimator 27a. The Doppler spread estimator estimates the Doppler spread using the channel estimates and then sends the estimated Doppler spread to the signal processor 31a. The operation of the Doppler spread estimator will be discussed in greater detail below. The signal processor 31a processes the sampled signal to extract information, and the signal processor 31a provides feedback to the channel estimator 25a so that the channel estimates can be improved after the Doppler spread estimation.

The receiver Rb of FIG. 3 is adapted for use without known pilot symbols. This receiver includes an antenna 21b that receives the signal r, a radio receiver and converter 23b, a channel estimator 25b, a Doppler spread estimator 27b, a symbol estimator 29b, and a signal processor 31b. The receiver Rb is similar to the receiver Ra of FIG. 2 with the exception that the symbol estimator 29b is used instead of the known symbol block 29a used in the receiver of FIG. 2. The symbol estimator 29b can be used in applications where symbols are not known. The symbol estimator 29b, for example, can use error detection and correction techniques to estimate received symbols with a high level of accuracy. These estimated symbols can then be used by the channel estimator 25b to estimate the channel h. The Doppler spread estimator 27b uses the channel estimates to estimate the Doppler spread as discussed in greater detail below.

In code-division multiple access (CDMA) cellular systems (such as IS-95 systems), a transmitter transmits a stream of known symbols known as the pilot code. The pilot code is transmitted on the same channel and at the same time as other information bearing symbols using different spreading codes. The receiver Rc of FIG. 4 provides Doppler spread estimations in such a CDMA system. The receiver Rc of FIG. 4 is adapted for use with known pilot symbols, and this receiver includes an antenna 21c that receives the signal r, a radio receiver and converter 23c, a channel estimator 25c, a Doppler spread estimator 27c, and a signal processor 31c. In this CDMA receiver, the channel can be estimated directly by the channel estimator 25c without the known symbol block 29a of FIG. 1 or the symbol estimator 29b of FIG. 2, and the channel estimates used for Doppler spread estimation.

The channel estimator 25c correlates the received signal r including the known pilot code and other codes in additive superimposition, and filters the resultant complex correlation to obtain channel estimates. The received signal can also be correlated with other codes carrying information to be decoded. The results of correlating with information carrying codes are multiplied by the conjugate of pilot code correlations for the same delay, and the results added to coherently combine the multi-path signals. In wide band CDMA (WBCDMA) systems, modulation symbol intervals may be much shorter thus allowing multiple propagation paths to be resolved with much finer time resolution.

The receivers of FIGS. 2–4 thus illustrate various receivers including Doppler spread estimators according to the present invention. In each receiver, channel estimates are provided to the Doppler spread estimator for calculation of the Doppler spread estimates. Receivers including Doppler spread estimators according to the present invention are not limited to the channel estimators discussed above, and those having skill in the art will recognize that any channel estimation technique can be used to provide channel estimates.

In particular, the channel estimator can generate an estimate of the channel over a TDMA time slot using symbols representing data samples received during the time slot. For example, the receiver Rb of FIG. 3 can include the symbol estimator 296 to estimate the symbols. The Doppler spread estimator can then use the channel estimate for the current time slot to calculate a Doppler spread estimate for the current time slot, and the signal processor can use this Doppler spread estimate in calculations for subsequent time slots, such as calculations of channel estimates for subsequent time slots. In other words, the Doppler spread estimate for the current time slot can be used to update a long term Doppler estimate in the signal processor which is used in subsequent calculations. The long term Doppler estimate can be updated, for example, using averaging techniques discussed in greater detail below.

When a symbol estimator is used as discussed with reference to FIG. 3, it may be useful to perform a cyclical redundancy check (CRC) on the estimated symbols used to calculate the Doppler spread estimate for the time slot. If the cyclical redundancy check passes, the channel estimate should be relatively accurate, and the resulting Doppler spread estimate can be used to update the long term Doppler estimate. If the cyclical redundancy check fails, however, the channel estimate may be unreliable, and it may thus be desirable to not update the long term Doppler estimate using a Doppler spread estimate based on a potentially unreliable channel estimate.

The Doppler spread estimation will now be discussed in greater detail with reference to the Doppler spread estimator of FIG. 5. The Doppler spread estimator can be used, for example, with receivers of radiotelephone communication systems operating according to either the DAMPS or DAMPS+standards. In DAMPS+, known pilot symbols are provided. In DAMPS, with a multi-pass demodulation, the Class 1 bits demodulated in the first pass can be used as pilot symbols if they pass the cyclical redundancy check (CRC). Preferably, phase ambiguities between the pilot slots is reduced to increase the reliability of the results. A method of resolving phase ambiguity is discussed, for example, in the reference by T. Fulghum entitled "Channel Interpolation On Second Pass Demodulation", (Tech. Rep. Tr/X 98:1230, Ericsson, RTP, NC, Feb. 22, 1999) the disclosure of which is hereby incorporated herein in its entirety by reference.

Assuming that the pilot symbols are available and that the phase ambiguity between pilot symbols has been reduced to an acceptable level, samples of the autocorrelation function $\hat{R}_e$ can be found by the autocorrelation calculator 51 using the channel estimates obtained from the pilot symbols. The samples of the autocorrelation function are then compared with different hypotheses ($H_1, H_2, H_3, \ldots H_k$) of the true autocorrelation function of different Doppler spread values using the hypothesis comparator 53 to provide error calculations ($e_{1(m)}, e_{2(m)}, e_{3(m)}, \ldots e_{k(m)}$) for the autocorrelation function samples with respect to each of the hypotheses. Each of the error calculations can then be averaged over several slots using the averager 55 to provide a respective plurality of averaged error values ($e_{av,1}, e_{av,2}, e_{av,3}, \ldots e_{av,k}$). The Doppler spread corresponding to the hypothesis resulting in the lowest averaged error value is then selected by the minimum error selector 57 to provide the estimated Doppler spread $\hat{f}_{doppler}$.

Figures 6, 7:
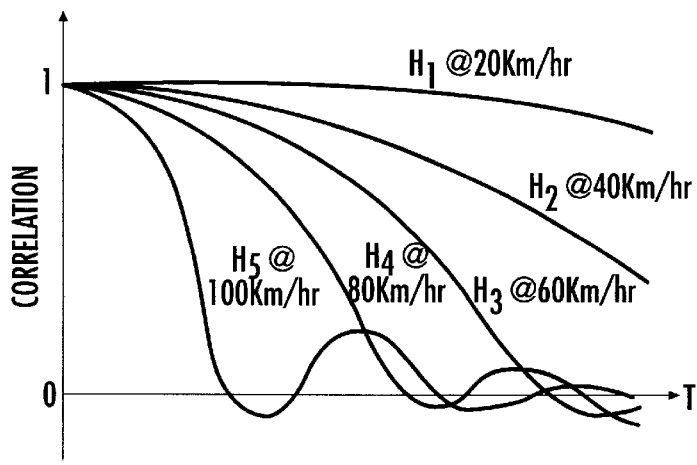
FIG. 6 is a graph illustrating autocorrelation functions for radio channels at different speeds of a receiver relative to a base station.
FIG. 7 is a table illustrating a storage of samples of the autocorrelation functions of FIG. 6.

In greater detail, the channel estimates can be determined using techniques available now or in the future, and the hypotheses of the different autocorrelation functions ($H_1, H_2, H_3, \ldots H_k$) corresponding to different Doppler spread values can be calculated and stored in memory. In particular, actual radio channels and corresponding Doppler spread values can be determined at different mobile terminal speeds relative to the base station, and the resulting autocorrelation functions can be calculated for each speed. Graphical examples of hypotheses of different autocorrelation functions (correlation vs. $\tau$) corresponding to radio channels measured at different speeds and corresponding to different Doppler spread values are illustrated in FIG. 6.

Figure 5:
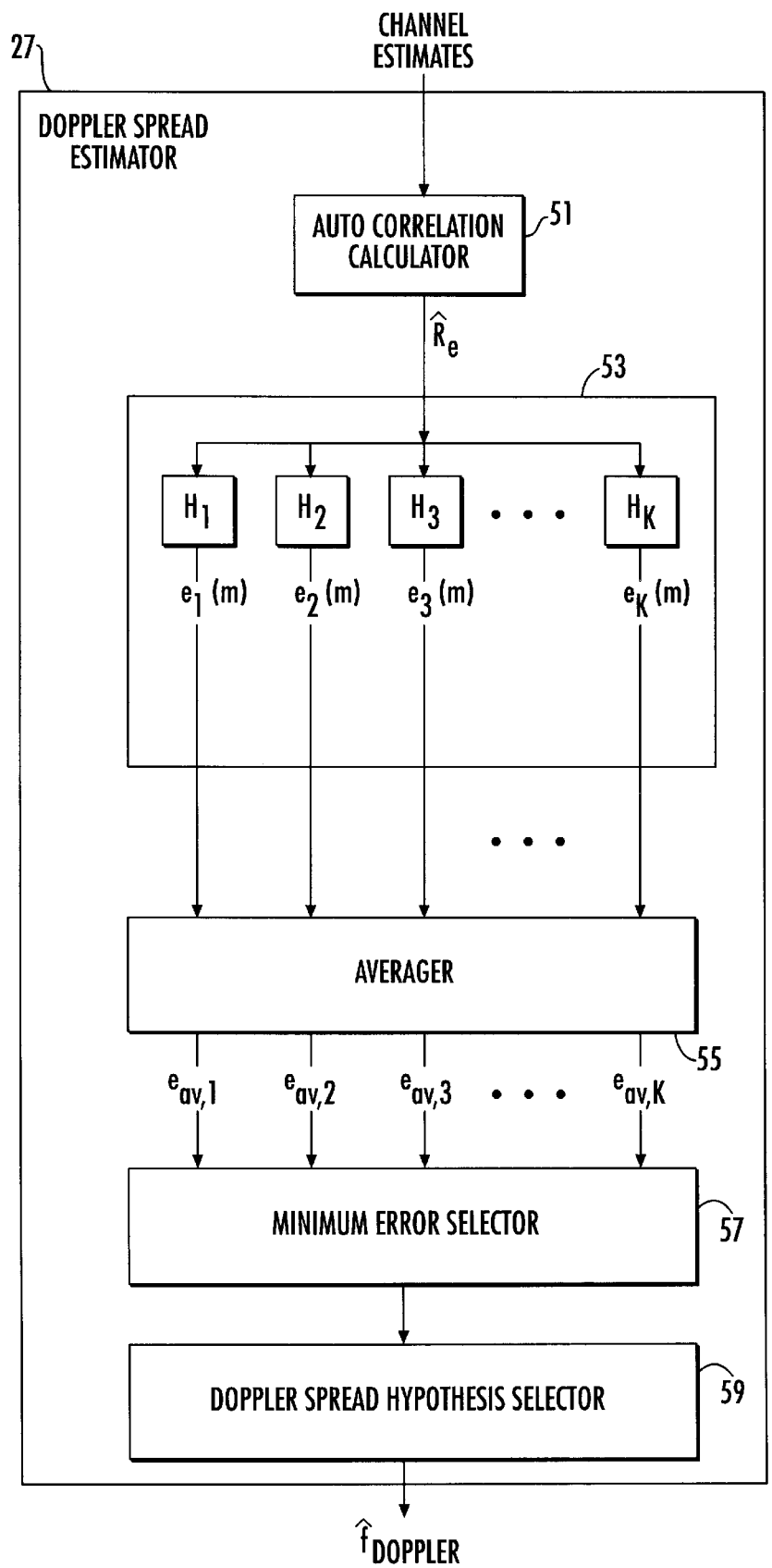
FIG. 5 is a block diagram of a Doppler spread estimator according to the present invention.

Samples of each autocorrelation function representing a respective hypothesis $H_k$ can be stored in memory for the hypothesis comparator 53 to provide the hypothesis $H_1, H_2, H_3, \ldots H_k$ shown in FIG. 5. For example, samples of each autocorrelation function of the graph of FIG. 6 corresponding to different values of $\tau$ can be stored in memory as illustrated in FIG. 7. While five different hypotheses are shown in the graph of FIG. 6, any number can be used. A greater number (k) of hypotheses can be used to provide a greater accuracy in the estimation of Doppler spread values, while a fewer number (k) of hypotheses can provide less complicated operation with fewer calculations and a lower memory requirement. Moreover, the number of samples z saved for each hypothesis can be varied depending on the desired level of accuracy for the Doppler spread estimation.

The autocorrelation function estimation for a channel with frequency error can be calculated using the autocorrelation estimator 51 using the channel estimates over the known field as:

$$\hat{R}_e(\tau) = \frac{1}{L-\tau} \sum_{k=\tau+1}^{L} \hat{h}_e(k)\hat{h}_e^*(k-\tau). \qquad \text{(equation 2)}$$

In this equation, $\hat{R}_e$ is the estimated autocorrelation function including the frequency error, and $\hat{h}_e$ is the channel estimates over the known fields (or pilot symbols). Note that when there is a frequency error in the received signal, it may directly effect the channel estimates which may be rotated by the amount of the frequency error thus effecting the autocorrelation estimate. Designating the frequency error as $f_e$, the rotation in the channel estimates can be calculated as:

$$\hat{h}_e(k) = \hat{h}e^{j2\pi f_e kT}, \qquad \text{(equation 3)}$$

where $\hat{h}$ represents the channel estimates when there is no frequency error. The autocorrelation function with frequency error can thus be rewritten as:

$$\hat{R}_e(\tau) = \frac{1}{L-\tau} \sum_{k=\tau+1}^{L} \hat{h}(k)e^{j2\pi f_e kT}\hat{h}*(k-\tau)e^{j2\pi f_e (k-\tau)T}, \qquad \text{(equation 4)}$$

or:

$$\hat{R}_e(\tau) = \hat{R}(\tau)e^{-j2\pi f_e \tau T}, \qquad \text{(equation 5)}$$

where $\hat{R}(\tau)$ is the autocorrelation estimate without the frequency error.

The frequency error $f_e$ can be calculated using know methods as discussed for example in the reference by Morelli et al. entitled "Further Results In Carrier Frequency Estimation For Transmissions Over Flat Fading Channels", (*IEEE Commun. Letters*, vol. 2, pp. 327–330, December 1998), the disclosure of which is hereby incorporated herein in its entirety by reference. The effect of the frequency error can thus be removed from the correlation of the channel estimates as:

$$R(\tau) = R_e(\tau)e^{j2\pi_e \pi T}, \qquad \text{(equation 6)}$$

The frequency error-free correlation estimates can then be compared with the different hypotheses ($H_1, H_2, H_3, \ldots H_k$) of the hypothesis comparator 53.

The hypotheses ($H_1, H_2, H_3, \ldots H_k$) can be determined and stored in memory as discussed above with regard to FIGS. 6 and 7. The error $e_k(m)$ of the autocorrelation estimate $\hat{R}_e$ with respect to each of the hypotheses is calculated using:

$$e_k(m) = \sum_{n=1}^{N} \left| \hat{R}(n) - \hat{R}(0)R_{H,k}(n) \right|^2. \qquad \text{(equation 7)}$$

In this equation, $e_k(m)$ is the error corresponding to the mth slot between the estimated autocorrelation function and the different samples of the kth hypothesis of the normalized true autocorrelation function $R_{H,k}(n)$ given as:

$$R_{H,k}(n) = J_0(2\pi f_{doppler,k} nT), \qquad \text{(equation 8)}$$

where $f_{doppler,k}$ is the kth Doppler spread hypothesis. The error term $e_k$ is averaged over several slots at the averager 55 (filter) using the equation:

$$e_{av,k} = \frac{1}{M} \sum_{m=1}^{M} e_k(m), \qquad \text{(equation 9)}$$

where $e_{av,k}$ is the averaged error corresponding to the kth hypothesis, and M is the length of the averaging window. In this example, block averaging is used to average the error. Alternately, other averaging techniques such as running averaging or sliding window averaging can be used. Averaging thus reduces statistical errors.

The minimum error selector 57 determines the lowest of the averaged errors $e_{av,k}$ to select the autocorrelation function hypothesis $H_k$ most closely approximating the autocorrelation function for the received channel. The Doppler spread hypothesis selector selects the Doppler spread hypothesis corresponding to the selected autocorrelation function hypothesis as the estimate of the Doppler spread $\hat{f}_{doppler}$. In other words, the minimum of the averaged errors $e_{av,1} - e_{av,k}$ is used to select the autocorrelation function hypothesis resulting in the lowest averaged error (at the minimum error selector 57), and the Doppler spread hypothesis corresponding to the selected autocorrelation function hypothesis is selected as the estimate of the Doppler spread (at the Doppler spread hypothesis selector 59) according to the following equation.

$$\hat{f}_{doppler} = \arg_{f_{doppler,k}} \min e_{av,k}. \qquad \text{(equation 10)}$$

Alternately, the autocorrelation function with frequency error can be calculated as discussed in the Morelli et al. reference. Instead of finding the frequency error and removing it from the estimated autocorrelation function, we can take the absolute value of the estimated autocorrelation to obtain the envelope autocorrelation function as:

$$\tilde{R}(\tau) = |\hat{R}(\tau)| = |\hat{R}(\tau)e^{-j2\pi f_e \pi T}| = |\hat{R}(\tau)|. \qquad \text{(equation 11)}$$

This absolute value of the autocorrelation function estimate (without frequency error) can then be compared with the different hypotheses of the true envelope autocorrelation function corresponding to the different Doppler spread values as:

$$e_k(m) = \sum_{n=1}^{N} \left| \tilde{R}(n) - \tilde{R}(0)\tilde{R}_{H,k}(n) \right|^2 \qquad \text{(equation 12)}$$

where, $$\tilde{R}_{H,k}(n) = |J_0(2\pi f_{doppler,k} nT)|. \qquad \text{(equation 13)}$$

The error terms are used as before to determine the hypothesis that provides the least error in the estimation of the Doppler spread value.

In DAMPS systems, phase ambiguity can be substantially removed within a time slot using known techniques. Phase ambiguity across time slots, however, may still exist. According to the present invention, the correlation within slots can be estimated and compared with the different hypotheses. Errors across slots, however, are averaged.

As previously discussed, the number of hypotheses can be varied depending on the desired accuracy and complexity of the Doppler spread estimator and receiver. A greater number of hypotheses can provide greater accuracy while requiring more memory and computation. A fewer number of hypotheses can reduce memory use and computation while providing a less accurate Doppler spread estimation.

The Doppler spread estimation methods according to the present invention can thus be implemented with relative computational efficiency, and good results. In particular, the use of the envelope correlation function can provide a level of performance close to that of other techniques without requiring frequency error estimation.

Doppler estimation, according to the present invention, can be performed, for example, in the context of a DAMPS cellular radio telephone system using the following downlink slot and transmission formats: π/4-DQPSK with root raised cosine pulse shaping; TDMA frame of 20 ms; and 3 users sharing the TDMA frame. Moreover, each user can transmit twice during a frame with a slot duration of 6.667 ms. The transmission medium can be a Rayleigh fading channel, and the channel can be simulated using Jake's fading model. A single antenna receiver and a carrier frequency of 1900 MHz can be used.

In downlink joint demodulation, only one Doppler spread needs to be estimated for both desired and interfering signals because both desired and interfering base stations are fixed and the mobile terminal is moving. This assumption is reasonable assuming there is no direct path. The Doppler spreads can thus be estimated using information corresponding to the stronger user which is the desired user in most cases.

In the receiver, ideal sync location can be assumed to be known, and the received samples can be used to coherently demodulate the user's information sequences. Kalman based channel estimation using a second order autoregressive model (AR-2) can be used for channel tracking. As discussed above, channel tracking depends on the Doppler information. As the Doppler information may not be known initially, the tracker parameters can be initially set to a relatively high Doppler spread of 100 Hz. As the Doppler spread estimate converges to the actual Doppler spread, the tracker parameters should also be changed in the adaptive receiver.

The present invention may be embodied as methods or devices. In addition, the invention may take the form of an entirely hardware embodiment, an entirely software embodiment, or an embodiment combining both hardware and software aspects. The present invention has been described in part with respect to the block diagrams of FIGS. 1–5. It will be understood that each block of the illustrations, and combinations of blocks, can be implemented by computer program instructions. These program instructions, which may represent steps, may be provided to a processor to produce a machine.

Accordingly, blocks of the block diagrams support combinations of means for performing the specified functions in combinations of steps for performing the specified functions. It will be understood that each block of the illustrations, and combinations of blocks, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for estimating a Doppler spread for a communications channel, the method comprising:
    providing an estimate of the communications channel;
    generating an autocorrelation function for the estimate of the communications channel;
    selecting one of a plurality of autocorrelation function hypotheses to approximate the autocorrelation function for the estimate of the communications channel wherein each of the autocorrelation function hypotheses corresponds to a respective Doppler spread estimate hypothesis; and
    selecting one of the Doppler spread estimate hypotheses corresponding to the selected autocorrelation function hypotheses as an estimate of the Doppler spread for the communications channel.

2. A method according to claim 1 wherein selecting one of the autocorrelection function hypotheses comprises comparing the autocorrelation function for the estimate of the communications channel with each of the plurality of autocorrelation function hypotheses.

3. A method according to claim 1 wherein selecting one of the autocorrelation function hypotheses comprises selecting one of the plurality of autocorrelation function hypotheses most closely approximating the autocorrelation function for the estimate of the communications channel.

4. A method according to claim 1 wherein selecting one of the autocorrelation function hypotheses comprises:
    generating a plurality of error signals respectively corresponding to the plurality of autocorrelation function hypotheses wherein each of the error signals represents a difference between the respective autocorrelation function hypothesis and the autocorrelation function of the estimate of the communications channel; and
    comparing the error signals to select the autocorrelation hypothesis to approximate the autocorrelation function for the estimate of the communications channel.

5. A method according to claim 4 wherein comparing the error signals comprises choosing an error signal representing a least difference between the corresponding autocorrelation function hypothesis and the autocorrelation function for the estimate of the communications channel.

6. A method according to claim 5 wherein choosing the error signal comprises choosing a least one of the error signals.

7. A method according to claim 4 wherein comparing the error signals is preceded by:
    averaging each of the error signals to provide averaged error signals wherein comparing the error signals comprises comparing the averaged error signals.

8. A method according to claim 7 wherein averaging each of the error signals comprises one of block averaging, running averaging, and sliding window averaging.

9. A method according to claim 1 wherein each of the plurality of autocorrelation function hypotheses comprises a plurality of samples and wherein the autocorrelation function for the estimate of the communications channel comprises a plurality of samples.

10. A method according to claim 1 wherein the communications channel comprises a radio channel.

11. A method according to claim 1 wherein the autocorrelation function comprises a plurality of samples and wherein generating the autocorrelation function comprises reducing a frequency error of the plurality of samples.

12. A method according to claim 1 further comprising:
    providing a second estimate of the communications channel using the estimate of the Doppler spread for the communications channel.

13. A method according to claim 1 wherein providing an estimate of the communications channel comprises receiving a plurality of samples of data over the communications channel wherein the samples of data are used to generate the channel estimates, the method further comprising:
performing a cyclical redundancy check on the samples of data used to generate the channel estimates;
updating a long term Doppler estimate with the estimate of the Doppler spread when the samples of data pass the cyclical redundancy check.

14. A method according to claim 1 wherein providing an estimate of the communications channel comprises:
receiving a plurality of pilot symbols over the communications channel;
reducing phase ambiguity between the pilot symbols; and
using the pilot symbols having reduced ambiguity to provide the estimate of the communications channel.

15. A method according to claim 1 wherein providing an estimate of the communications channel is preceded by:
receiving a signal over the communications channel wherein the signal represents data from a remote transmitter, and wherein providing an estimate of the communications channel comprises generating an estimate of the communications channel over which the signal is received.

16. A Doppler spread estimator for estimating a Doppler spread for a communications channel, the Doppler spread estimator comprising:
a plurality of autocorrelation function hypotheses corresponding to a respective plurality of Doppler spread estimate hypotheses;
a channel estimator that estimates the communications channel;
an autocorrelation generator that generates an autocorrelation function for the estimate of the communications channel;
an autocorrelation function hypothesis tester that selects one of the autocorrelation function hypotheses to approximate the autocorrelation function for the estimate of the communications channel; and
a Doppler spread hypothesis selector that selects one of the Doppler spread estimate hypotheses corresponding to the selected autocorrelation function hypotheses as an estimate of the Doppler spread for the communications channel.

17. A Doppler spread estimator according to claim 16 wherein the hypothesis tester compares the autocorrelation function for the estimate of the communications channel with each of the plurality of autocorrelation function hypotheses.

18. A Doppler spread estimator according to claim 16 wherein the hypothesis tester selects one of the plurality of autocorrelation function hypotheses most closely approximating the autocorrelation function for the estimate of the communications channel.

19. A Doppler spread estimator according to claim 16 wherein the hypothesis tester generates a plurality of error signals respectively corresponding to the plurality of autocorrelation function hypotheses wherein each of the error signals represents a difference between the respective autocorrelation function hypothesis and the autocorrelation function of the estimate of the communications channel, and wherein the hypothesis tester compares the error signals to select the autocorrelation hypothesis to approximate the autocorrelation function for the estimate of the communications channel.

20. A Doppler spread estimator according to claim 19 wherein the hypothesis tester chooses an error signal representing a least difference between the corresponding autocorrelation function hypothesis and the autocorrelation function for the estimate of the communications channel.

21. A Doppler spread estimator according to claim 20 wherein the hypothesis tester chooses a least one of the error signals.

22. A Doppler spread estimator according to claim 19 wherein the hypothesis tester averages each of the error signals to provide averaged error signals wherein the hypothesis tester compares the averaged error signals.

23. A Doppler spread estimator according to claim 22 wherein the hypothesis tester averages each of the error signals using one of block averaging, running averaging, and sliding window averaging.

24. A Doppler spread estimator according to claim 16 wherein each of the plurality of autocorrelation function hypotheses comprises a plurality of samples and wherein the autocorrelation function for the estimate of the communications channel comprises a plurality of samples.

25. A Doppler spread estimator according to claim 16 wherein the communications channel comprises a radio channel.

26. A Doppler spread estimator according to claim 16 wherein the autocorrelation function comprises a plurality of samples and wherein the autocorrelation generator reduces a frequency error of the plurality of samples.

27. A Doppler spread estimator according to claim 16 wherein the channel estimator provides a second estimate of the communications channel using the estimate of the Doppler spread for the communications channel.

28. A Doppler spread estimator according to claim 16 wherein the channel estimator receives a plurality of samples of data over the communications channel wherein the samples of data are used to estimate the communications channel, wherein the channel estimator performs a cyclical redundancy check on the samples of data used to generate the channel estimates, the Doppler spread estimator further comprising:
a long term Doppler estimator wherein the long term Doppler estimator is updated with the estimate of the Doppler spread when the samples of data pass the cyclical redundancy check.

29. A Doppler spread estimator according to claim 16 wherein the channel estimator receives a plurality of pilot symbols over the communications channel, reduces phase ambiguity between the pilot symbols, and uses the pilot symbols having reduced ambiguity to provide the estimate of the communications channel.

30. A method for receiving communications, the method comprising:
receiving a signal over a communications channel wherein the signal represents data from a remote transmitter;
generating an estimate of the communications channel over which the signal is received;
generating an autocorrelation function for the estimate of the communications channel;
selecting one of a plurality of autocorrelation function hypotheses corresponding to a respective plurality of Doppler spread estimate hypotheses to approximate the autocorrelation function for the estimate of the communications channel;
selecting one of the Doppler spread estimate hypotheses corresponding to the selected autocorrelation function hypotheses as an estimate of the Doppler spread for the communications channel; and reproducing an estimate of the data transmitted by the remote transmitter.

31. A method according to claim 30 wherein selecting one of the autocorrelection function hypotheses comprises comparing the autocorrelation function for the estimate of the communications channel with each of the plurality of autocorrelation function hypotheses.

32. A method according to claim 30 wherein selecting one of the autocorrelation function hypotheses comprises selecting one of the plurality of autocorrelation function hypotheses most closely approximating the autocorrelation function for the estimate of the communications channel.

33. A method according to claim 30 wherein selecting one of the autocorrelation function hypotheses comprises:

generating a plurality of error signals respectively corresponding to the plurality of autocorrelation function hypotheses wherein each of the error signals represents a difference between the respective autocorrelation function hypothesis and the autocorrelation function of the estimate of the communications channel; and comparing the error signals to select the autocorrelation hypothesis to approximate the autocorrelation function for the estimate of the communications channel.

34. A method according to claim 33 wherein comparing the error signals comprises choosing an error signal representing a least difference between the corresponding autocorrelation function hypothesis and the autocorrelation function for the estimate of the communications channel.

35. A method according to claim 34 wherein choosing the error signal comprises choosing a least one of the error signals.

36. A method according to claim 35 wherein comparing the error signals is preceded by:

averaging each of the error signals to provide averaged error signals wherein comparing the error signals comprises comparing the averaged error signals.

37. A method according to claim 36 wherein averaging each of the error signals comprises one of block averaging, running averaging, and sliding window averaging.

38. A method according to claim 30 wherein each of the plurality of autocorrelation function hypotheses comprises a plurality of samples and wherein the autocorrelation function for the estimate of the communications channel comprises a plurality of samples.

39. A method according to claim 30 wherein the communications channel comprises a radio channel.

40. A method according to claim 30 wherein the autocorrelation function comprises a plurality of samples and wherein generating the autocorrelation function comprises reducing a frequency error of the plurality of samples.

41. A method according to claim 30 further comprising:

providing a second estimate of the communications channel using the estimate of the Doppler spread for the communications channel.

42. A method according to claim 30 wherein providing an estimate of the communications channel comprises receiving a plurality of samples of data over the communications channel wherein the samples of data are used to generate the channel estimates, the method further comprising:

performing a cyclical redundancy check on the samples of data used to generate the channel estimates;

updating a long term Doppler estimate with the estimate of the Doppler spread when the samples of data pass the cyclical redundancy check.

43. A method according to claim 30 wherein the data received from the remote transmitter comprises pilot symbols, and wherein generating an estimate of the communications channel comprises:

reducing phase ambiguity between the pilot symbols; and using the pilot symbols having reduced ambiguity to provide the estimate of the communications channel.

44. A receiver comprising:

a radio receiver and converter that receives a signal over a communications channel;

a channel estimator that estimates the communications channel responsive to the signal received over the communications channel;

a plurality of autocorrelation function hypotheses corresponding to a respective plurality of Doppler spread estimate hypotheses;

an autocorrelation generator that generates an autocorrelation function for the estimate of the communications channel;

an autocorrelation function hypothesis tester that selects one of the autocorrelation function hypotheses to approximate the autocorrelation function for the estimate of the communications channel; and a Doppler spread hypothesis selector that selects one of the Doppler spread estimate hypotheses corresponding to the selected autocorrelation function hypotheses as an estimate of the Doppler spread for the communications channel.

45. A receiver according to claim 44 wherein the hypothesis tester compares the autocorrelation function for the estimate of the communications channel with each of the plurality of autocorrelation function hypotheses.

46. A receiver according to claim 44 wherein the hypothesis tester selects one of the plurality of autocorrelation function hypotheses most closely approximating the autocorrelation function for the estimate of the communications channel.

47. A receiver according to claim 44 wherein the hypothesis tester generates a plurality of error signals respectively corresponding to the plurality of autocorrelation function hypotheses wherein each of the error signals represents a difference between the respective autocorrelation function hypothesis and the autocorrelation function of the estimate of the communications channel, and wherein the hypothesis tester compares the error signals to select the autocorrelation hypothesis to approximate the autocorrelation function for the estimate of the communications channel.

48. A receiver according to claim 47 wherein the hypothesis tester chooses an error signal representing a least difference between the corresponding autocorrelation function hypothesis and the autocorrelation function for the estimate of the communications channel.

49. A receiver according to claim 48 wherein the hypothesis tester chooses a least one of the error signals.

50. A receiver according to claim 47 wherein the hypothesis tester averages each of the error signals to provide averaged error signals wherein the hypothesis tester compares the averaged error signals.

51. A receiver according to claim 50 wherein the hypothesis tester averages each of the error signals using one of block averaging, running averaging, and sliding window averaging.

52. A receiver according to claim 44 wherein each of the plurality of autocorrelation function hypotheses comprises a plurality of samples and wherein the autocorrelation function for the estimate of the communications channel comprises a plurality of samples.

53. A receiver according to claim 44 further comprising:
a signal processor coupled between the Doppler spread estimator and the channel estimator wherein the signal processor modifies the operation of the channel estimator responsive to the estimate of the Doppler spread for the communications channel.

54. A receiver according to claim 44 wherein the communications channel comprises a radio channel.

55. A receiver according to claim 44 wherein the autocorrelation function for the estimate of the communications channel comprises a plurality of samples and wherein the autocorrelation generator reduces a frequency error of the plurality of samples.

56. A receiver according to claim 44 wherein the channel estimator provides a second estimate of the communications channel using the estimate of the Doppler spread for the communications channel.

57. A receiver according to claim 44 wherein the signal received over the communications channel comprises a plurality of samples of data wherein the channel estimator uses the samples of data to estimate the communications channel, wherein the channel estimator performs a cyclical redundancy check on the samples of data used to generate the channel estimates, the receiver further comprising:
a long term Doppler estimator wherein the long term Doppler estimator is updated with the estimate of the Doppler spread when the samples of data pass the cyclical redundancy check.

58. A receiver according to claim 44 wherein the signal received over the communications channel comprises a plurality of pilot symbols, wherein the channel estimator reduces phase ambiguity between the pilot symbols, and wherein the channel estimator uses the pilot symbols having reduced phase ambiguity to provide the estimate of the communications channel.

59. A Doppler spread estimator comprising:
means for providing an estimate of a communications channel;
means for generating an autocorrelation function for the estimate of the communications channel;
means for selecting one of a plurality of autocorrelation function hypotheses to approximate the autocorrelation function for the estimate of the communications channel wherein each of the autocorrelation function hypotheses corresponds to a respective Doppler spread estimate hypothesis; and
means for selecting one of the Doppler spread estimate hypotheses corresponding to the selected autocorrelation function hypotheses as an estimate of the Doppler spread for the communications channel.

60. A Doppler spread estimator according to claim 59 wherein the means for selecting one of the autocorrelection function hypotheses comprises means for comparing the autocorrelation function for the estimate of the communications channel with each of the plurality of autocorrelation function hypotheses.

61. A receiver comprising:
means for receiving a signal over a communications channel wherein the signal represents data from a remote transmitter;
means for generating an estimate of the communications channel over which the signal is received;
means for generating an autocorrelation function for the estimate of the communications channel;
means for selecting one of a plurality of autocorrelation function hypotheses corresponding to a respective plurality of Doppler spread estimate hypotheses to approximate the autocorrelation function for the estimate of the communications channel;
means for selecting one of the Doppler spread estimate hypotheses corresponding to the selected autocorrelation function hypotheses as an estimate of the Doppler spread for the communications channel; and
means for reproducing an estimate of the data transmitted by the remote transmitter.

62. A receiver according to claim 61 wherein the means for selecting one of the autocorrelection function hypotheses comprises means for comparing the autocorrelation function for the estimate of the communications channel with each of the plurality of autocorrelation function hypotheses.

63. A receiver according to claim 61 wherein the means for selecting one of the autocorrelation function hypotheses comprises means for selecting one of the plurality of autocorrelation function hypotheses most closely approximating the autocorrelation function for the estimate of the communications channel.

* * * * *

UNITED STATES PATENT AND TRADEMARK OFFICE
CERTIFICATE OF CORRECTION

PATENT NO. : 6,680,969 B1
DATED : January 20, 2004
INVENTOR(S) : Molnar et al.

It is certified that error appears in the above-identified patent and that said Letters Patent is hereby corrected as shown below:

Title page,
should include the following:
Item [56], References Cited, U.S. PATENT DOCUMENTS, insert -- 5,606,580 2/1997 Mourot et al. ............... 375/340 --
FOREIGN PATENT DOCUMENTS -- EP   0 363 640 4/1990........... H04K/3/00
                                                                                 JP   11234190A   8/1999 --
OTHER PUBLICATIONS -- International Search Report for PCT/US00/21081 --

Column 13,
Line 34, should read -- 36. A method according to claim 33, wherein comparing --

Signed and Sealed this

Twenty-second Day of June, 2004

JON W. DUDAS
*Acting Director of the United States Patent and Trademark Office*